United States Patent [19]

Prahl

[11] Patent Number: 5,077,060
[45] Date of Patent: Dec. 31, 1991

[54] METHOD OF INDUCING THE DECARBOXYLATION OF MALIC ACID IN MUST OR FRUIT JUICE

[75] Inventor: Claus Prahl, Gr sted, Denmark

[73] Assignee: Chr. Hansen's Laboratorium A/S, Hørsholm, Denmark

[21] Appl. No.: 543,802

[22] PCT Filed: Jan. 24, 1989

[86] PCT No.: PCT/DK89/00009

§ 371 Date: Jul. 25, 1990

§ 102(e) Date: Jul. 25, 1990

[87] PCT Pub. No.: WO89/06685

PCT Pub. Date: Jul. 27, 1989

[30] Foreign Application Priority Data

Jan. 25, 1988 [DK] Denmark .............................. 327/88

[51] Int. Cl.$^5$ .......................... C12C 11/00; C12G 1/00
[52] U.S. Cl. ........................................ 426/15; 426/16; 426/52
[58] Field of Search ................... 426/15, 11, 16, 599, 426/52

[56] References Cited

PUBLICATIONS

"The Development and Utilization of Freeze-Dried Malolactic Bacteria Cultures for Inoculation of Wine", R. B. Beelman and G. R. Duke, *Malolactic Fermentation*, pp. 53-63, (1984).
"Inducing Simultaneous Malolactic-Alcoholic Fermentation in Red Table Wines", R. B. Beelman and R. E. Kunkee, *Malolactic Fermentation*, pp. 97-112, (1984).
"Development and Utilization of Starter Cultures to Induced Malolactic Fermentation in Red Table Wines", R. Beelman, *Proc. Grape and Wine Centennial Symp.*, pp. 109-117, (1982).
"Malo-Lactic Fermentation", R. Kunkee, *Adv. Appl. Microbio.*, 9:235-279, (1967).
"Etude De La Degradation De L'Acide L-Malique Par Les Bacteries Lactiques Non Proliferantes Isolees Des Vins", S. Lafon-Lafourcade, *Ann. Techol. Argic.*, 19:141-154 (1970).
"Viability of Micrococci and Lactobacilli upon Freezing and Freeze-Drying in the Presence of Different Cryoprotectants", T. S. Tsvetkov & R. Brankova, *Cryobiology*, 20:318-323, (1983).
Peynaud, C. R. *Acad. Sci. Paris*, Ser. D., 207(1):121-122, (1968), cited in 16-Fermentations, 69:5445 (1968).
Kvasnikov & Yustratova, *Vinodel. Vinograd SSR* 28(3):8-10, (1968), cited in Chem. Abstracts, 69:322B (1968).
Crapisi et al., *J. Appl. Microbiol.*, 63(3):513-521, (1987), cited in Chem. Abstracts, 108 (1988).
Lonvaud et al., *Connais. Vigne Vin.* 11(1):73-91 (1977), cited in 16-Fermentations, vol. 87, 1977.
Rodrigo et al., *Rev. Agroquim. Tecnol. Aliment,* 26(4):539-551 (1986), cited in 17-Food, Feed Chem., vol.
Chalfin and Goldberg, *J. Food Sci.* 42(4):939-943 (1977), cited in 16-Fermentations, vol. 87, 1977.
Crapisi et al., *J. Appl. Bacteriol.* 63(3):513-521 (1987), cited in Chemical Abstracts, vol. 108, 1988.
"Comparative traits of *Lactobacillus brevis, Lact. fructivorans* and *Leuconostoc oenos* Immobilized Cells for the Control of Malo-Lactic Fermentation in Wine", A. Crapisi et al., *J. Appl. Bacteriol.* 63:513-521 (1987).
"Untersuchungen uber die experimentelle Durchfuhrung des biologischen Saureabbaues", F. Radler, *Vitis*, 1:42-52 (1957).

*Primary Examiner*—Marianne Cintins
*Attorney, Agent, or Firm*—Foley & Lardner

[57] ABSTRACT

In a method of inducing decarboxylation of malic acid in must or fruit juice (also known as maloactic fermentation), must or fruit juice is directly inoculated with a culture of viable malolatic bacteria of the genus Lactobacillus, the bacteria being capable of decarboxylating malic acid at a pH below about 3.2 without any significant consumption of sugar present in the must or fruit juice and substantially without any production of volatile acidity. The malolactic bacteria may be added before or at the commencement of alcoholic fermentation. One malolatic strain suitable in the method is *Lactobacillus plantarum* DSM 4361.

20 Claims, 4 Drawing Sheets

METHOD OF INDUCING THE DECARBOXYLATION OF MALIC ACID IN MUST OR FRUIT JUICE

FIELD OF INVENTION

The present invention relates to a method of inducing the decarboxylation of malic acid to lactic acid in must or fruit juice by means of lactic acid bacteria, as well as to a composition comprising bacteria useful in the method.

BACKGROUND OF THE INVENTION

The decarboxylation of malic acid to lactic acid by certain species of lactic acid bacteria in the production of wine has been recognized for a long time. As malic acid is one of the most common organic acids in grapes (and other fruit), its decarboxylation to lactic acid results in a significant reduction of the acidity of the wine; this is particularly important for wines produced from grapes grown in cool areas as these have a high natural acidity. Another advantage of the conversion of malic acid to lactic acid (which in the literature and in the following description is often termed malolactic fermentation, for which reason the lactic acid bacteria capable of converting malic acid to lactic acid are termed malolactic bacteria in the present context) is that no further microbial fermentations may take place in the wine so that it becomes bacteriologically stable. Furthermore malolactic fermentation may exert some influence on the flavour of the wine.

In traditional vinification the decarboxylation process has been allowed to occur spontaneously as a result of the growth of an indigenous flora of lactic acid bacteria originating from the vines and grape skins and also often surviving on winery equipment, especially wooden casks or other equipment made of wood, from one season to the next, these bacteria decarboxylating malic acid to produce lactic acid. When occurring in this fashion, malolactic fermentation is often delayed and may take place several months after the alcoholic fermentation. The initial number of bacteria is often quite small and the environment of the wine is frequently rather hostile to the growth of these bacteria due to the content of ethanol and sulphur dioxide in the wine, as well as its low pH and nutrient concentration. The long lag phase of the malolactic bacteria during which the wine is biologically unstable may result in the growth of bacteria which produce volatile acidity and hence spoilage of the wine. Apart from this certain malolactic bacteria spontaneously growing in the wine may produce certain compounds, e.g. diacetyl and acetoin, that tend to give rise to "off" flavours or odours in the wine.

Even so, it is common practice to stimulate malolactic fermentation by reducing the content of sulphur dioxide, delaying the removal of the lees, increasing the temperature of the wine or ensuring a pH of more than 3.4. These conditions, however, also encourage the growth of other microorganisms in the wine, thus increasing the likelihood of wine spoilage and this approach therefore requires extremely careful supervision of the decarboxylation process.

Furthermore, the self-inoculation of the wine by indigenous bacteria is difficult, not to say impossible, to control, and its occurrence has become even more unpredictable as winery hygiene has improved stainless steel tanks having in many cases replaced wooden casks etc. Such measures serve to ensure a uniform quality of the wine and reduce the risk of spoilage. However, they also reduce the chance of spontaneous conversion of malic acid taking place in the wine. For this reason and because the winemaker will often prefer to exercise a greater degree of control over the decarboxylation process strains of malolactic bacteria have recently been isolated and cultivated with the purpose of adding them to wine or must in order to make sure that malolactic fermentation will take place.

In the previously known methods of inducing decarboxylation of malic acid by means of a selected strain of a malolactic bacterium, a culture of the malolactic bacterium which has been reactivated (i.e. a frozen or lyophilized culture which is adapted and/or propagated in a medium containing nutrients, must or wine) prior to use is added to fermented wine (the most usual approach) or, less frequently, to must before the alcoholic fermentation. The reactivation takes at least 24 hours and usually up to several days and requires special facilities in the winery for the propagation of the cultures. Furthermore, the bacteria may be susceptible to phage attack during the propagation period, or the culture may become contaminated with other microorganisms which are undesirable in wine, for which reasons the use of reactivated cultures may not always result in a satisfactory malolactic fermentation in the wine.

Although reactivation or propagation of the malolactic cultures is generally recommended in the literature, attempts have been made to inoculate wine directly with rehydrated lyophilized malolactic bacteria (R. B. Beelman and G. R. Duke. "The development and utilization of freeze-dried malolactic cultures for inoculation of wine" in *Malolactic Fermentation,* ed. T. H. Lee, Proceedings of a seminar organized by the Australian Society of Viticulture and Oenology Inc. and held 16th August 1984 in Melbourne, Victoria, pp. 53-63). However, this resulted in a quite lengthy lag phase (where no malic acid was converted) before commencement of malolactic fermentation, and reactivation of the cultures was therefore recommended. Experiments have also been carried out where rehydrated malolactic bacteria were added directly to grape must (R. B. Beelman and R. E. Kunkee, "Inducing simultaneous malolactic-alcoholic fermentation in red table wines" supra, pp 97-112), resulting in induction of malolactic fermentation. At economically feasible inoculation levels, the conversion of malic acid however, was not complete at a desirably fast rate, taking about 14-28 days, and propagation of the lyophilized cultures prior to inoculation was therefore recommended.

The bacterium most usually indicated for the deliberate induction of malolactic fermentation is *Leuconostoc oenos,* originally isolated from wine *Leuc. oenos.* however, often requires adaptation to the particular wine to which it is added in order to grow. Furthermore, when it is added directly to wine or must without any prior reactivation, it shows a quite lengthy lag phase of up to several weeks before it grows to a population which is sufficiently numerous to be active in decarboxylating the malic acid present in the wine resulting in a greater risk of wine spoilage due to contamination with organisms producing volatile acidity. Furthermore, *Leuc. oenos* is heterofermentative (i.e capable of producing volatile acidity so that it can only be used safely after the alcoholic fermentation is complete, thus retarding the malolactic fermentation. Also, malolactic fermentation by *Leuc. oenos* is inhibited at pH values below 3.2 which is less convenient as malolactic fermentation is most desirable in acidic wines.

The only other malolactic bacterium indicated for deliberate induction of malolactic fermentation seems to be *Lactobacillus hilgardii* isolated from wine. The strain is, however, described as heterofermentative, thus giving rise to the same limitations in its use as *Leuc. oenos*, and is, indeed, only indicated for use in admixture with a *Leuc. oenos* strain in a composition intended for reactivation before addition to fermented wine.

In order to ensure a high efficiency of the decarboxylation of malic acid and an easy inoculation procedure, it is therefore required to use a malolactic organism which possesses a high activity which is safer in that decarboxylation takes place substantially without the formation of volatile acids, which is suited for direct inoculation without showing any lag phase and which tolerates a low pH.

SUMMARY OF THE INVENTION

The present inventor has found that malolactic bacteria of the genus *Lactobacillus may advantageously be employed for inducing malolactic fermentation in liquids containing malic acid by direct inoculation.*

Accordingly, the present invention relates to a method of inducing decarboxylation of malic acid in must or fruit juice in which must or fruit juice is directly inoculated with a culture of viable malolactic bacteria belonging to the genus Lactobacillus the bacteria being capable of decarboxylating malic acid at a pH below about 3.2, without any significant consumption of sugar present in the must or fruit juice and substantially without any production of volatile acidity.

As noted above, it is important that the malolactic culture is active in converting malic acid to lactic acid at pH values of 3.2 or less as malolactic fermentation is most advantageously carried out to reduce the acidity of acidic beverages which may be wine but also various non-alcoholic beverages based on fruit juice some of which may have an undesirably high acidity. This should not be understood to mean that the bacterium may not be malolactically active at pH values above 3.2, but only that bacterial strains of interest for the present purpose are selected for their ability to decarboxylate malic acid at relevant low pH values.

It is also important that the malolactic bacteria used in the method of the present invention are bacteria which substantially do not ferment major amounts of sugar (glucose and fructose) to lactic acid in the presence of malic acid since this, when the method is used to ferment must to wine, would result in a lower alcohol content of the wine. It is equally essential that the malolactic bacteria are selected according to the criterion that they do not convert sugar to volatile acids, principally acetic acid which would result in spoilage of the wine In most cases this means that the bacteria should be homofermentative so that, in the preparation of wine they may be added as early in the process as possible without risking wine spoilage, whereas the known heterofermentative strains of *Leuc. oenos* currently used to induce malolactic fermentation cannot safely be added before the alcoholic fermentation is complete in order to avoid the formation of volatile acids. This means that when using the Lactobacilli selected according to these criteria for winemaking, the malolactic culture can be added at such a stage in the fermentation process that the malolactic fermentation is complete when the alcoholic fermentation is complete. The use of the so selected Lactobacilli thus makes it possible to finish the wine early (by filtration and/or sulphitation to prevent spoilage microorganisms from growing in the wine). The Lactobacillus species employed in the present process also do not need any conditioning to the wine to which they are added which means that there is substantially no lag phase before the commencement of the malolactic fermentation. Hence the decarboxylation of malic acid is complete in a few days rather than after several weeks as is usual with the Leuconostoc cultures currently employed.

Where fruit juice is concerned, the malolactic culture is primarily added in order to reduce the acidity thereof thus transforming the juice into a more palatable beverage. At present, sugar or an artificial sweetener is often added to fruit juice or soft drinks prepared on the basis thereof in order to improve their taste. The addition of a malolactic culture to reduce the acidity is preferable to adding sugar or another sweetener since this provides pure juice which does not contain any additives.

The present invention also relates to wine or fruit juice in which at least about 40%, preferably at least about 80% and in particular about 90% or more of the malic acid has been converted to lactic acid by the present method.

In a still further aspect, the present invention relates to a liquid, spray-dried, freeze-dried, droplet-frozen or deep-frozen composition which comprises a culture of viable malolactic bacteria belonging to the genus Lactobacillus, the bacteria being capable of decarboxylating malic acid at a pH below about 3.2, without any significant consumption of sugar present in must or fruit juice and substantially without producing any volatile acidity.

DETAILED DISCLOSURE OF THE INVENTION

Species of malolactic bacteria which may be useful in the present method are selected from *Lactobacillus plantarum, Lactobacillus delbrückii, Lactobacillus buckneri, Lacrobacillus hilgardii, Lactobacillus brevis, Lactobacillus casei, Lactobacillus acidophilus, Lactobacillus fermentum, Lactobacillus collinoides, Lactobacillus fructivorans, Lactobacillus homohiochii, Lactobacillus sake, Lactobacillus yamanashiensis* and mixtures thereof (cf. Bergey's Manual. 1986).

Strains of these species are selected for their ability to decarboxylate malic acid at a pH below about 3.2, without any significant consumption of sugar present in the must or fruit juice and substantially without any production of volatile acidity. The latter two qualities makes it advantageous to employ these bacteria for winemaking where they can be added before, at the commencement of or in the early stages of alcoholic fermentation without causing any reduction of the alcohol content of the finished wine, and without producing volatile acids to such an extent that the resulting wine is spoiled Thus, malolactic fermentation may be finished before the alcoholic fermentation which means that it is possible to stabilise the wine by, e.g. filtration and sulphitation immediately after the alcoholic fermentation is complete, thereby reducing the risk of spoilage since microorganisms producing volatile acidity cannot establish themselves in the wine. The malolactic organism is preferably so selected that malolactic fermentation in the must/wine is complete within 14 days preferably within 7 days or even less such as within 4 days. The alcoholic fermentation may for instance be one induced by the addition of yeast (this has become common in some wineries where the use of concrete or stainless steel equipment is standard); hence, the malolactic culture may be added before or simultaneously with the addition of yeast to the must.

Since, unlike the known malolactic strains currently employed for inducing malolactic fermentation in wine, in particular *Leuc. oenos,* which are heterofermentative and therefore not safe to add before the alcoholic fermentation is ended, the malolactic strains useful in the present method may be added to unfermented or fermenting must without having any deleterious effects on the resulting wine, the strain is preferably one which is incapable of surviving in fermented wine, i.e. it cannot tolerate the alcohol concentrations present in the wine. When the malolactic fermentation is completed, or shortly after that, the alcoholic fermentation will normally have proceeded to a point where the alcohol concentration is sufficient to inhibit the growth and metabolism of the malolactic bacteria which eventually die In this way there is no risk of bacterial influence on the later, delicate phases of alcoholic fermentation.

One malolactic strain which has been found to be particularly advantageous to employ in the present method is a strain of *Lactobacillus plantarum.* The strain was isolated from a fermenting must and characterized by its fermentation pattern as determined by API 50 CH: positive reaction on L-arabinose, ribose, galactose, D-glucose, D-fructose, D-mannose, mannitol, sorbitol, N-acetyl glucosamine, amygdaline, arbutine, esculine, salicine, cellobiose, maltose, lactose, melibiose, saccharose, trehalose, melezitose, D-raffinose, beta-gentiobiose weak reactions on glycerol and gluconate. Species: *Lactobacillus plantarum.*

The strain was further identified by Dr S Lafon-Lafourcade at the Institute of Oenology University of Bordeaux on the basis of API fermentation patterns, the ratio between D-lactic acid and L-lactic acid (about 50:50) formed from glucose, and the absence of arginine dehydrolase activity to be a strain of *Lactobacillus plantarum.*

This strain of *Lactobacillus plantarum* was deposited in accordance with the provisions of the Budapest Treaty on the International Recognition of the Deposit of Microorganisms for the Purposes of Patent Procedure, on 18 January, 1988 in Deutsche Sammlung von Mikroorganismen, Mascheroder Weg 1B. D-3300 Braunschweig, FRG, with the Accession No DSM 4361.

Bacteria useful for the present purpose may be cultivated under anaerobic conditions in a liquid medium containing assimilable carbohydrate, nitrogen, and essential micronutrients, e.g. one of the media described by Beelman (Beelman R 1982: "Development and utilization of starter cultures to induce malolactic fermentation in red table wines", In Webb, A. D. (ed.): "Proceedings from the Grape and Wine Centenary Symposium, U. C. Davis, California U.S.A.", pp 109-117). Kunkee (Kunkee R. E. 1967: "Malo-lactic fermentation" *Adv. Appl. Microbiol,* 9: 235-279) or Lafon-Lafourcade (Lafon-Lafourcade, S. 1970: "Etude de la degradation de l'acide malique par les bactdries 19: 141-154). The liquid culture may be concentrated by centrifugation or ultrafiltration and frozen or freeze-dried after addition of cryoprotective agents such as those described by Tsvetkov and Brankova (Tsvetkov, T. S. and Brankova R. 1983: "Viability of Micrococci and Lactobacilli upon freezing and freeze-drying in the presence of different cryoprotectants", *Cryobiology* 20: 318-323).

In the method of the present invention, the malolactic culture is added in an amount of about $10^5-10^8$ colony-forming units(CFU)/ml of must or fruit juice. This bacterial concentration will either be sufficient in itself to ensure decarboxylation of malic acid within a brief period of time, or the inoculum will multiply to the required cell density within a period of time which is sufficiently brief to cause a rapid decarboxylation of malic acid in the must or juice The malolactic culture may be added in the form of a liquid, spray-dried, freeze-dried, droplet-frozen or deep-frozen composition comprising the malolactic bacteria. Although it is in theory possible to use the bacterial cultures as grown, that is together with the culture medium in which the bacteria have been propagated and which is subsequently added as such or in dried or frozen form to the unfermented or fermenting must, it is preferred to add the bacteria in the form of a concentrate, e.g. prepared by centrifugation and/or ultrafiltration, since this ensures higher inoculation levels of the bacteria and reduces the risk of contaminating the resulting wine with residual components of the spent media. The bacterial concentrate is preferably in dried or frozen state since this bacterial concentrate generally contains $10^{10}-10^{12}$ CFU/g of concentrate.

The composition is advantageously provided in the form of a freeze-dried concentrate. When freeze-drying the bacteria, a cryoprotecting agent may advantageously be added such as one of those disclosed by Tsvetkov and Brankova, supra.

Dried bacterial compositions may be added as such or be rehydrated before they are added to the must or fruit juice. The term "rehydration" should be understood to mean that the composition is simply admixed with a liquid such as water, must or juice substantially immediately prior to use. This is not to be confused with the procedure often described in the literature as reactivation whereby is meant incubation of the bacteria for 1-3 days in a small volume of juice or must in order to adapt the bacteria to the conditions prevailing in the wine or must to which they are added.

The must or fruit juice which may advantageously be subjected to malolactic fermentation by the method of the invention may be any type of must or juice ultimately intended for human consumption and benefitting from a flavour modification in the form of reduced acidity. Examples of fruit from which the must or fruit juice may be pre pared are grapes, apples cherries blackcurrants, redcurrants, citrus and elderberries. It should be noted that in the present context, the term "wine" not only includes grape wine but also wine produced from any of the other fruits indicated above; the term also includes other beverages produced by alcoholic fermentation such as cider.

However, the present method is currently preferred in the production of grape wine. Thus, in a currently preferred embodiment for producing red wine in which malolactic fermentation has occurred concurrently with the alcoholic fermentation, the malolactic bacteria are added to red wine must after crushing or destemming the grapes or in the fermentor to which the must containing the grape skins has been transferred. Alternatively, the malolactic bacteria may be added to a portion, such as 20-40%, of non-sulphited red wine must and left for 15-30 hours before making up to volume with sulphited red wine must The latter method may be employed to ensure an efficient mixing of the bacteria into the must.

In a currently preferred embodiment for the production of white or rosé wine in which malolactic fermentation has occurred concurrently with alcoholic fermentation, the malolactic bacteria are added to white or rosé wine must after pressing during clarification (statically or by centrifugation) or in the fermentor. Alternatively, the malolactic bacteria may be added to white or rosé wine must after the level of free $SO_2$ has decreased to below about 10 ppm since the bacteria are unable to survive at substantially higher levels of free $SO_2$.

BRIEF DESCRIPTION OF THE DRAWINGS

The present invention is further illustrated in the following with reference to the drawings in which.

Figure 1:
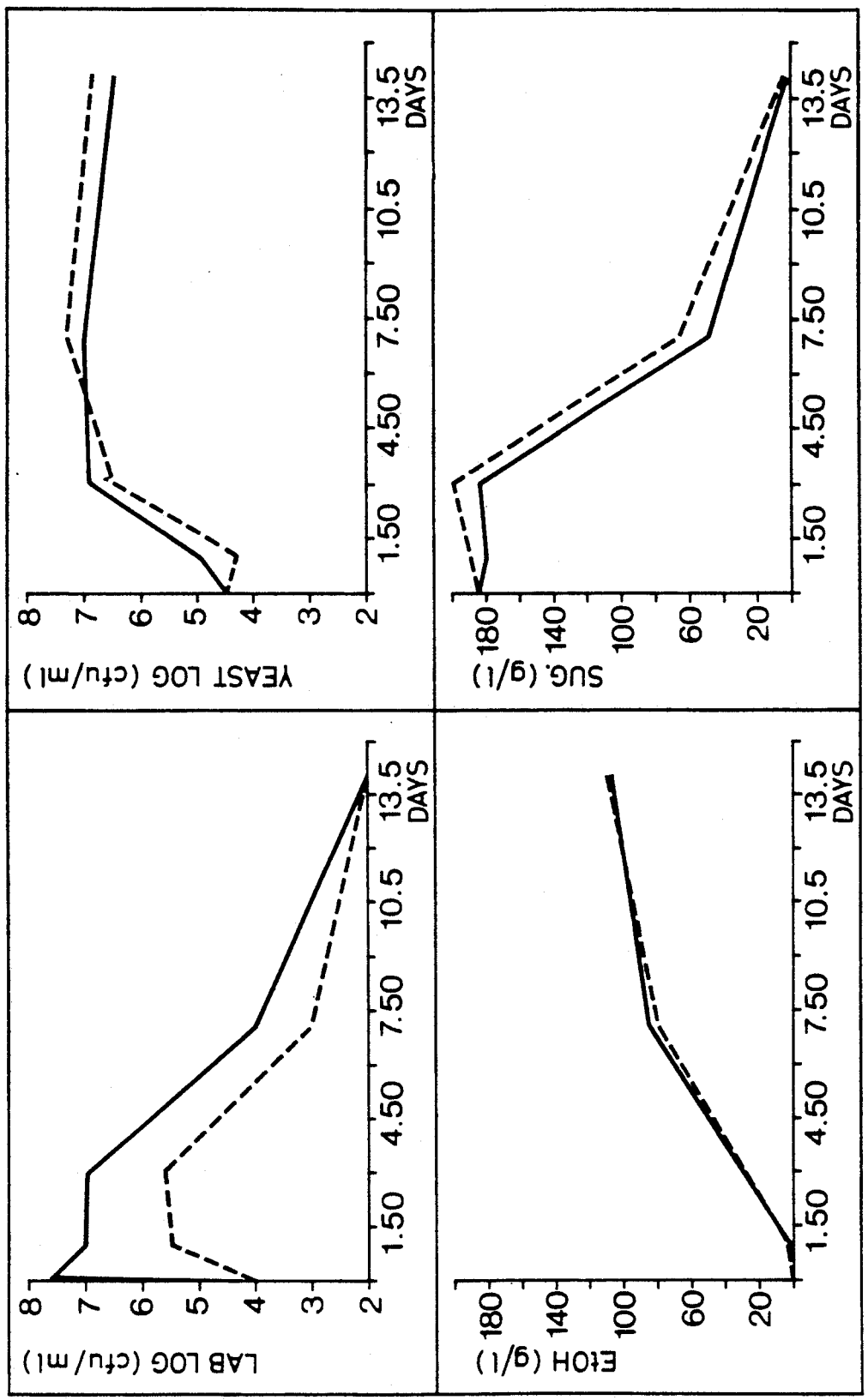
FIG. 1 shows the evolution of lactic acid bacteria (LAB), yeast, ethanol (EtOH) and reducing sugars (SUG) in red Merlot must inoculated with 10 g/hl of freeze-dried *L. plantarum*, DSM 4361, (—) compared with an uninoculated control (—)

The invention is described in further detail in the following non-limiting examples.

EXAMPLE 1

Six 10 l bottles were filled to 9 l with filtered, pasteurized white must (pH 3.3) prepared from Kerner/Müdller-Thurgau grapes. The must contained 12 ppm of $SO_2$ (total). The temperature was kept at 17°–20° C. On day 0, the bottles were inoculated with rehydrated suspensions of different commercially available strains of the yeast *Saccharomyces cerevisiae*. At the same time, the three test bottles were directly inoculated ($5 \times 10^7$ CFU/ml) with a suspension of *Lactobacillus plantarum* cells prepared from a freeze-dried culture (Chr. Hansen's Laboratorium A/S, Copenhagen) DSM No 4361, rehydrated in must for 30 minutes. The inoculation levels for yeast and bacteria corresponded to 10 g h$^{-1}$.

The results appear from Table 1 which shows alcoholic fermentation and malolactic fermentation in must inoculated with three different brands of active dry yeast "+"columns had simultaneously been in oculated with *L. plantarum*. "." columns had only been inoculated with yeast.

TABLE 1

| L. plantarum | Day | LALVIN V | | YEAST IRGA-FERM CM | | OENO-FERM | |
|---|---|---|---|---|---|---|---|
| | | − | + | − | + | − | + |
| Reducing su- | 0 | 186 | 186 | 186 | 186 | 186 | 186 |

TABLE 1-continued

| L. plantarum | Day | LALVIN V | | YEAST IRGA-FERM CM | | OENO-FERM | |
|---|---|---|---|---|---|---|---|
| | | − | + | − | + | − | + |
| gar, g l$^{-1}$ | 2 | 154 | 153 | 152 | 150 | 151 | 148 |
| | 6 | 128 | 137 | 122 | 126 | 129 | 124 |
| Ethanol, g l$^{-1}$ | 6 | 24.2 | 23.8 | 27.7 | 26.6 | 25.6 | 28.8 |
| Total acidity, g l$^{-1}$ | 0 | 7.1 | 7.1 | 7.1 | 7.1 | 7.1 | 7.1 |
| | 2 | 7.6 | 5.4 | 7.4 | 5.5 | 7.5 | 5.7 |
| | 6 | 7.7 | 6.0 | 7.9 | 6.1 | 7.7 | 6.1 |
| Volatile acidity, g l$^{-1}$ | 5 | 0.4 | 0.4 | 0.3 | 0.4 | 0.3 | 0.3 |
| L-malic acid, g l$^{-1}$ | 0 | 5.2 | 5.2 | 5.2 | 5.2 | 5.2 | 5.2 |
| | 2 | 4.1 | 1.2 | 4.5 | 1.2 | 4.3 | 1.2 |
| | 4 | 4.3 | 0.5 | 4.5 | 0.4 | 4.3 | 0.3 |

Conclusions

The example shows the initial phase of a series of very slow alcoholic fermentations. The Lactobacilli reduce the current of L-malic acid to less than 10% of the initial concentration in 4 days with no production of volatile acidity. After 6 days, about 30% of the sugar is fermented and the alcohol yield corresponds to the expected values, both when calculated from the sugar loss and when comparing the controls with the test bottles. Thus, no inhibition of the three yeast strains by the bacteria can be demonstrated.

EXAMPLE 2

$2 \times 250$ l of fresh unsterilized red must (pH 3.2) from Malbec grapes were directly inoculated with 25 g and 50 g, respectively, of *Lactobacillus plantarum* (Chr. Hansen's Laboratorium A/S, Copenhagen). DSM 4361. rehydrated in must for 30 minutes. Before and after malolactic fermentation samples were drawn from the test containers and compared with samples from an uninoculated control container. The fermentation was run at 18° C., the $SO_2$ concentration was 13 ppm (total) and the must contained 234 g l$^{-1}$ of sugar and 5.8 g l$^{-1}$ of L-malic acid. The results appear from Table 2.

TABLE 2

| | Control | Inoculated with L. plantarum | |
|---|---|---|---|
| | | 25 g | 50 g |
| Time to finish malolactic fermentation (days) | 28 | 21 | 9 |
| Ethanol after malolactic fermentation (% vol.) | 13.3 | 14.0 | 13.5 |
| Volatile acidity after malolactic fermentation (g l$^{-1}$) | 0.6 | 0.5 | 0.6 |
| Residual sugar after malolactic fermentation (g l$^{-1}$) | 2.3 | 1.8 | 3.0 |

It appears from Table 2 that malolactic fermentation proceeds (and is completed) faster in the inoculated must than in the control. There was no interference with alcoholic fermentation, and no production of volatile acidity arising from the use of the cultures of *L. plantarum*.

EXAMPLE 3

Three batches of white must (225 g l$^{-1}$ sugar) prepared from concentrated white grape juice were adjusted to pH 2.9, 3.1 and 3.3, respectively. The must was inoculated with active dry yeast (0.2 g l$^{-1}$). 1.5 l samples were drawn from the fermenting batches 0, 24 and 72 hours after the start of the alcoholic fermentation and inoculated with a freeze-dried, concentrated culture of L. plantarum, DSM 4361, supplied by Chr. Hansen's Laboratorium A/S, Copenhagen (0.1 g $l^{-1}$). The inoculation level was $5 \times 10^7$ CFU/ml. The temperature was 20.5° C. The results appear from Table 3 which shows alcoholic fermentation and malolactic fermentation at different pH values and after inoculation with Lactobacilli at different times.

TABLE 3

| | Day | pH 2.9 | | | pH 3.1 | | | pH 3.3 | | |
|---|---|---|---|---|---|---|---|---|---|---|
| | | 0 | 24 | 72 | 0 | 24 | 72 | 0 | 24 | 72 |
| Inoculation with L. plantarum hours | | | | | | | | | | |
| Density °Oechsle | 0 | 95 | | | 95 | | | 95 | | |
| | 1 | | 92 | | | 91 | | | 90 | |
| | 3 | | | 71 | | | 66 | | | 65 |
| | 7 | 45 | | | 38 | | | 28 | | |
| | 8 | | 35 | | | 32 | | | 24 | |
| | 10 | | | 27 | | | 25 | | | 15 |
| | 15 | 12 | | | 9 | | | 8 | | |
| | 16 | | 12 | | | 11 | | | 3 | |
| | 18 | | | 11 | | | 9 | | | 4 |
| L-malic acid g $l^{-1}$ | 0 | 4.2 | | | 4.7 | | | 4.3 | | |
| | 1 | | 4.1 | | | 4.3 | | | 4.2 | |
| | 3 | | | 4.1 | | | 4.0 | | | 3.9 |
| | 7 | 1.1 | | | 0.0 | | | 0.1 | | |
| | 8 | | 2.7 | | | 2.0 | | | 1.0 | |
| | 10 | | | 3.6 | | | 3.7 | | | 3.5 |
| | 15 | 1.0 | | | 0.2 | | | 0.2 | | |
| | 16 | | 2.5 | | | 1.4 | | | 0.6 | |
| | 18 | | | 3.6 | | | 3.3 | | | 3.6 |

Conclusion

The culture finishes malolactic fermentation in 7 days at pH 3.1 and 3.3 if added simultaneously with the yeast. At pH 2.9, 75% of the L-malic acid is decarboxylated. If added later, the limit to pH tolerance shifts upwards; when inoculated 24 hours after the start of alcoholic fermentation, a pH of 3.3 is necessary to complete malolactic fermentation; 86%–70% of the L-malic acid is decarboxylated at pH 3.1, and only 40% at pH 2.9. When added 72 hours after the yeast (or later—results not shown), the bacterial culture is not able to induce malolactic fermentation at the tested pH values.

EXAMPLE 4

A white must (190 g $l^{-1}$ sugar pH 3.3, 4 g $l^{-1}$ L-malic acid) was prepared from concentrated grape juice. 4 fermentors were filled to 1.5 l and supplemented with 0, 0.053, 0.089, 0.123 g $l^{-1}$ $K_2S_2O_5$ and 30 g $l^{-1}$ cellulose powder. The fermentors were left for 24 hours at 20° C. to simulate static clarification, the clear must was then siphoned into four sterile fermentors and inoculated with 0.1 g $l^{-1}$ of rehydrated active dry yeast (FERMIVIN®) and freeze-dried Lactobacillus plantarum (Chr. Hansen's Laboratorium A/S). DSM 4361, respectively. The fermentations (20° C.) were followed until completed.

The results appear from Table 4 which shows the effect of different concentrations of $SO_2$ upon alcoholic fermentation and malolactic fermentation in white must after simulated static clarification. Inoculations took place on day 0.

TABLE 4

| | | $K_2S_2O_5$, mg $l^{-1}$ added | | | |
|---|---|---|---|---|---|
| | day | 0 | 53 | 89 | 123 |
| $SO_2$ total mg $l^{-1}$ | −1 | 5 | 28 | 45 | 61 |
| | 0 | 5 | 28 | 44 | 59 |
| | 5 | 19 | 34 | 53 | 60 |
| | 14 | 20 | 33 | 48 | 63 |
| $SO_2$ free mg $l^{-1}$ | −1 | | 9 | 13 | 16 |
| | 0 | 3 | 4 | 5 | 6 |
| | 1 | 3 | 3 | 3 | 4 |
| Density, °Oechsle | 0 | 80 | 80 | 80 | 80 |
| | 1 | 69 | 70 | 72 | 75 |
| | 5 | 35 | 30 | 30 | 32 |
| | 14 | 0 | 0 | 0 | 0 |
| Ethanol, g $l^{-1}$ | 1 | 11.2 | 10.2 | 11.3 | 12.0 |
| | 5 | 54.0 | 61.2 | 56.0 | 51.4 |
| | 14 | 81.8 | 82.6 | 87.8 | 87.4 |
| L-malic acid, g $l^{-1}$ | 0 | 3.7 | 3.8 | 3.8 | 3.8 |
| | 1 | 2.0 | 2.8 | 3.0 | 3.4 |
| | 5 | 0.1 | 0.2 | 0.4 | 0.9 |
| | 9 | 0.2 | 0.2 | 0.4 | 0.9 |
| | 14 | | | | 0.2 |
| Lactobacilli, CFU $ml^{-1} \times 10^7$ | 0 | 5 | 5 | 5 | 5 |
| | 1 | 5 | 4 | 1 | 2 |
| | 5 | 2 | 1 | 2 | 0.7 |
| | 14 | 0.3 | 0.007 | 0.012 | 0.007 |

Conclusions

Malolactic fermentation is completed in 14 days or less at total $SO_2$ levels up to 60 ppm. At low levels of $SO_2$, malolactic fermentation is completed in less than 5 days. As the concentration of ethanol builds up during alcoholic fermentation, the Lactobacilli are killed. At the end of alcoholic fermentation (10.5% by volume of ethanol), the cell count has dropped to 6% of the inoculum when no $SO_2$ is added, and to 0.2% or less when $SO_2$ was added to the must.

EXAMPLE 5

200 l of red must from healthy Merlot grapes were inoculated with $5 \times 10^7$ CFU/ml of L. plantarum (DSM 4361) rehydrated in water for 30 minutes. Another 200 l batch was kept as an uninoculated control 30 ppm $SO_2$ were added to the must. At the time of inoculation the temperature was 25.2° C. and the pH 3.66. No yeast was added Pumping-over was performed regularly as in full-scale vinification. The experiment was followed throughout the vinification period. The results appear from FIGS. 1 and 2.

FIG. 1 shows how the indigenous lactic acid bacteria of the control grew from $10^4$ CFU/ml to $5 \times 10^5$ CFU/ml during the first 24 hours After 3 days, bacterial viability decreased as a result of alcohol formation. In the test, an initial loss of test bacteria was caused by the relatively high level of free $SO_2$ (FIG. 2), but even so the number of viable test bacteria stayed above $10^7$ CFU/ml for 3 days after which the bacteria were gradually eliminated by the alcohol. Neither the viability of the indigenous yeast in both batches nor the rate of sugar fermentation were affected by the treatment with malolactic culture.

Figure 2:
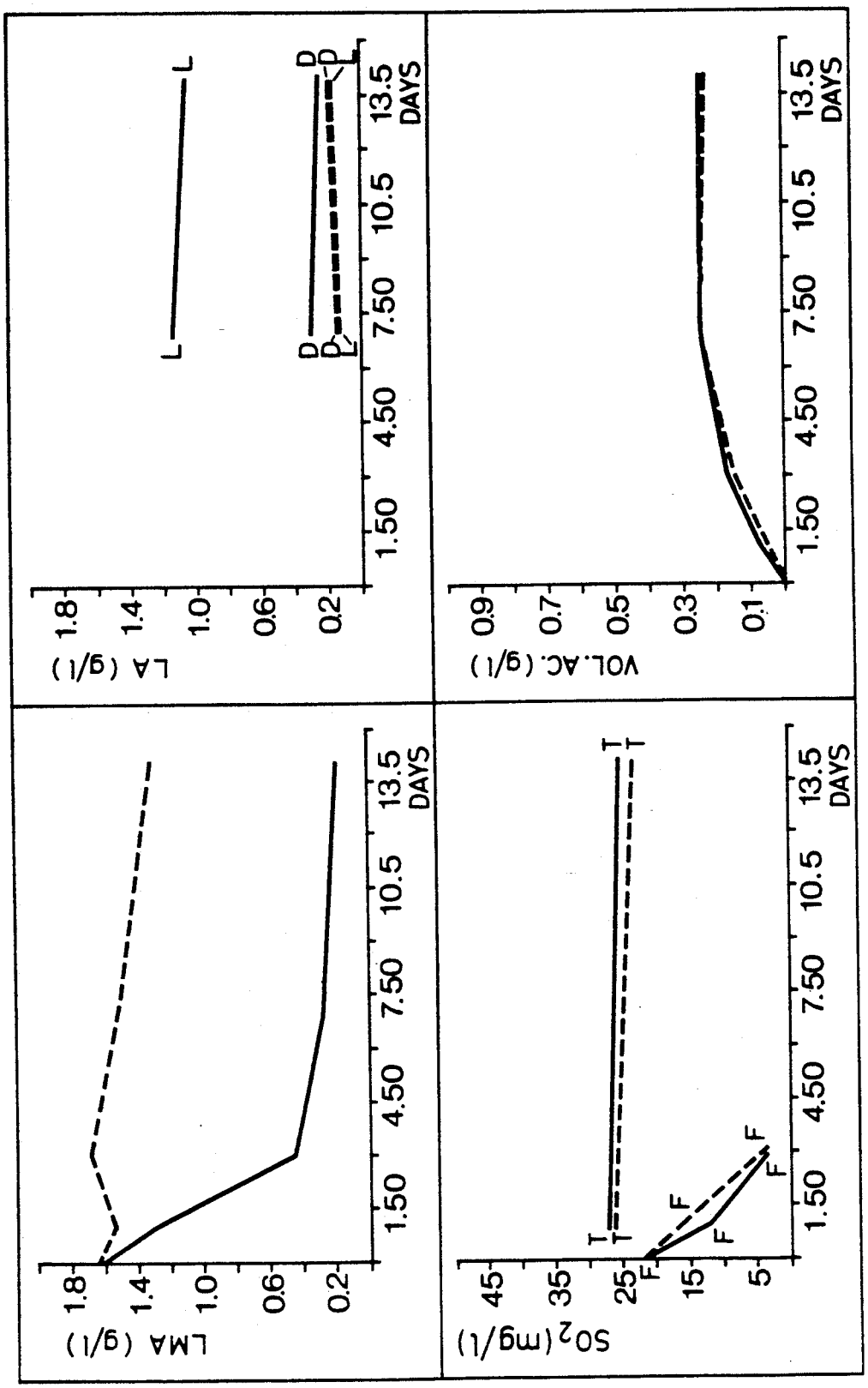
FIG. 2 shows concentrations of L-malic acid (LMA)-, D- and L-lactic acid (LA; D=D-lactic acid, L=L-lactic acid), free and total $SO_2$ (F=free, T=total) and volatile acidity (VOL.AC) in red Merlot must inoculated with 10 g/hl of freeze-dried *L. plantarum*, DSM 4361, (—) compared with uninoculated control (—)
Figure 3:
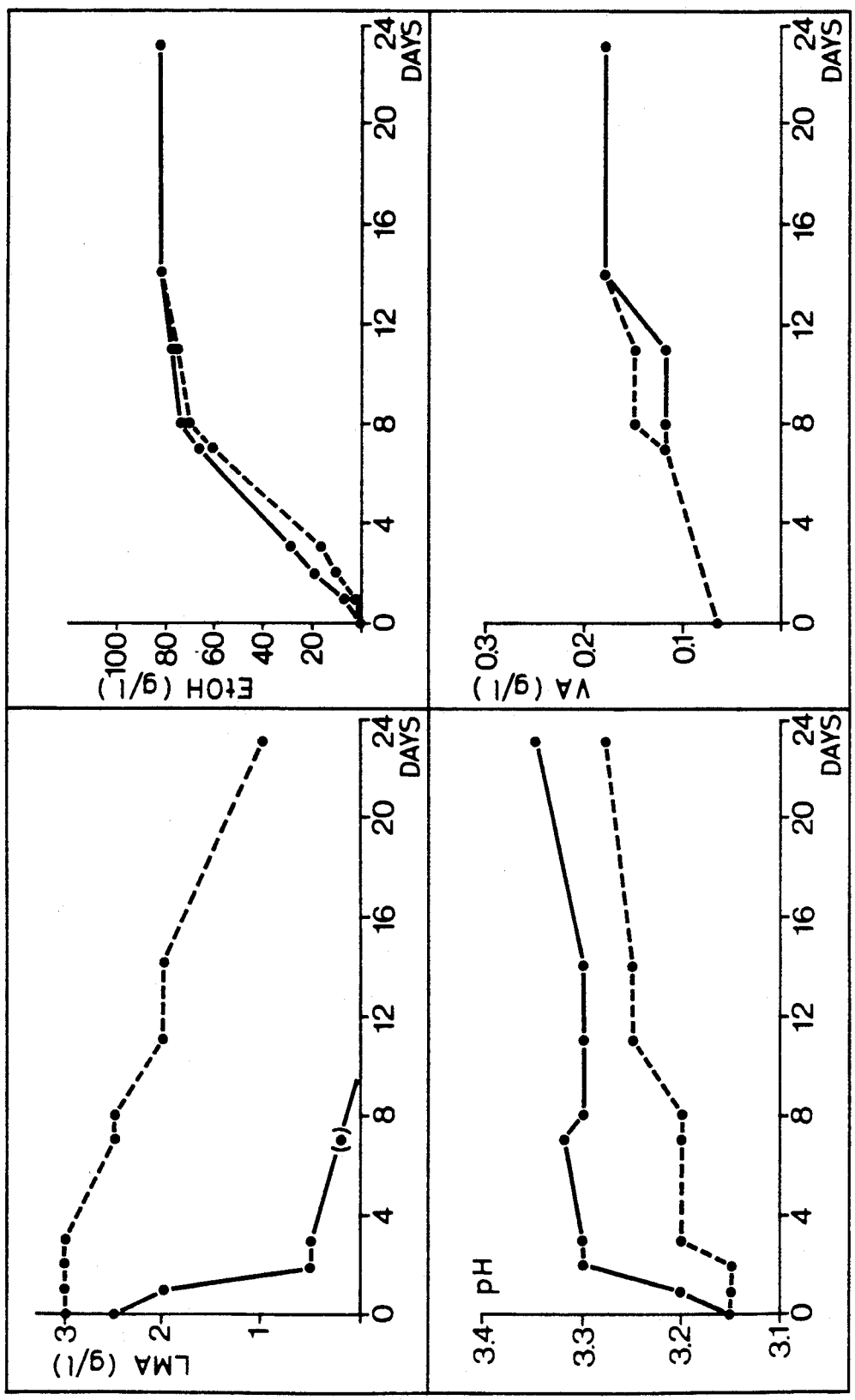
FIG. 3 shows the concentration of L-malic acid (LMA—determined by chromatography), ethanol (EtOH), pH and volatile acidity (VA) in red San Giovese must inoculated with 10 g/hl of *L. plantarum*, DSM 4361, (—) compared with an uninoculated control (—)

FIG. 2 shows that malolactic fermentation proceeded rapidly in the inoculated batch: 73% of the malic acid was degraded in 3 days. In the control, a slight degradation of malic acid could be attributed to the action of the yeast. A proper malolactic fermentation was not initiated in the control during the experimental period.

The level of L-lactic acid was substantially elevated in the test, mainly as a result of the decarboxylation of L-malic acid whereas only a slight increase in D-lactic acid was observed Since the inoculated bacteria produced a mixture of about 50% L- and 50% D-lactic acid from glucose, this result reflects that only negligible amounts of sugar were degraded by the bacteria. As observed in the laboratory, there is no production of volatile acidity by the inoculated bacteria.

EXAMPLE 6

A batch of red San Giovese must (171 g/l sugar, pH 3.15) was sulphited to 12 mg/l of $SO_2$. Freeze-dried *L. plantarum* (DSM 4361) were rehydrated in water for 30 minutes and used to inoculate 200 l of the must to a level of $5 \times 10^7$ CFU/ml. Another 200 l container served as an uninoculated control.

Malolactic fermentation commenced immediately and proceeded at a high rate in the inoculated must. 80% of the L-malic acid was decarboxylated in 2 days which elevated the pH from 3.15 to 3.30. When the alcoholic fermentation was completed, all of the L-malic acid had been degraded in the test whereas in the control, malolactic fermentation commenced slowly after a 7-day lag phase and was only ⅔ finished at the end of the experimental period. It was further confirmed that neither alcohol yield nor volatile acidity were influenced by the inoculated culture. The experiment showed that this method of inducing malolactic fermentation may be successfully employed even in rather acidic musts when the $SO_2$ is kept low.

In another experiment (not shown) with 100 hl of San Giovese must the total $SO_2$ was elevated from 10 to 32 ppm 24 hours after inoculation with $4 \times 10^7$ CFU/ml of bacteria. In this case, alcoholic fermentation was fast (finished in 5 days), but even so, the L-malic acid was degraded from 3.0 g/l to 0.5 g/l in 7 days whereafter the sampling of the tank was stopped.

EXAMPLE 7

16,000 l of white Chardonnay must (206 g/l sugar, pH 3.3, 4.5 g/l L-malic acid, no $SO_2$ added) were inoculated with $4 \times 10^7$ CFU/ml of freeze-dried *L. plantarum* (DSM 4361) and $10^6$ CFU/ml of active dry yeast. A similar batch was inoculated with yeast only and followed as a control. The temperature was 15° C. at inoculation and rose to a maximum of 20° C. during fermentation. One day after inoculation the must was transferred to oak barrels where the vinification continued.

Figure 4:
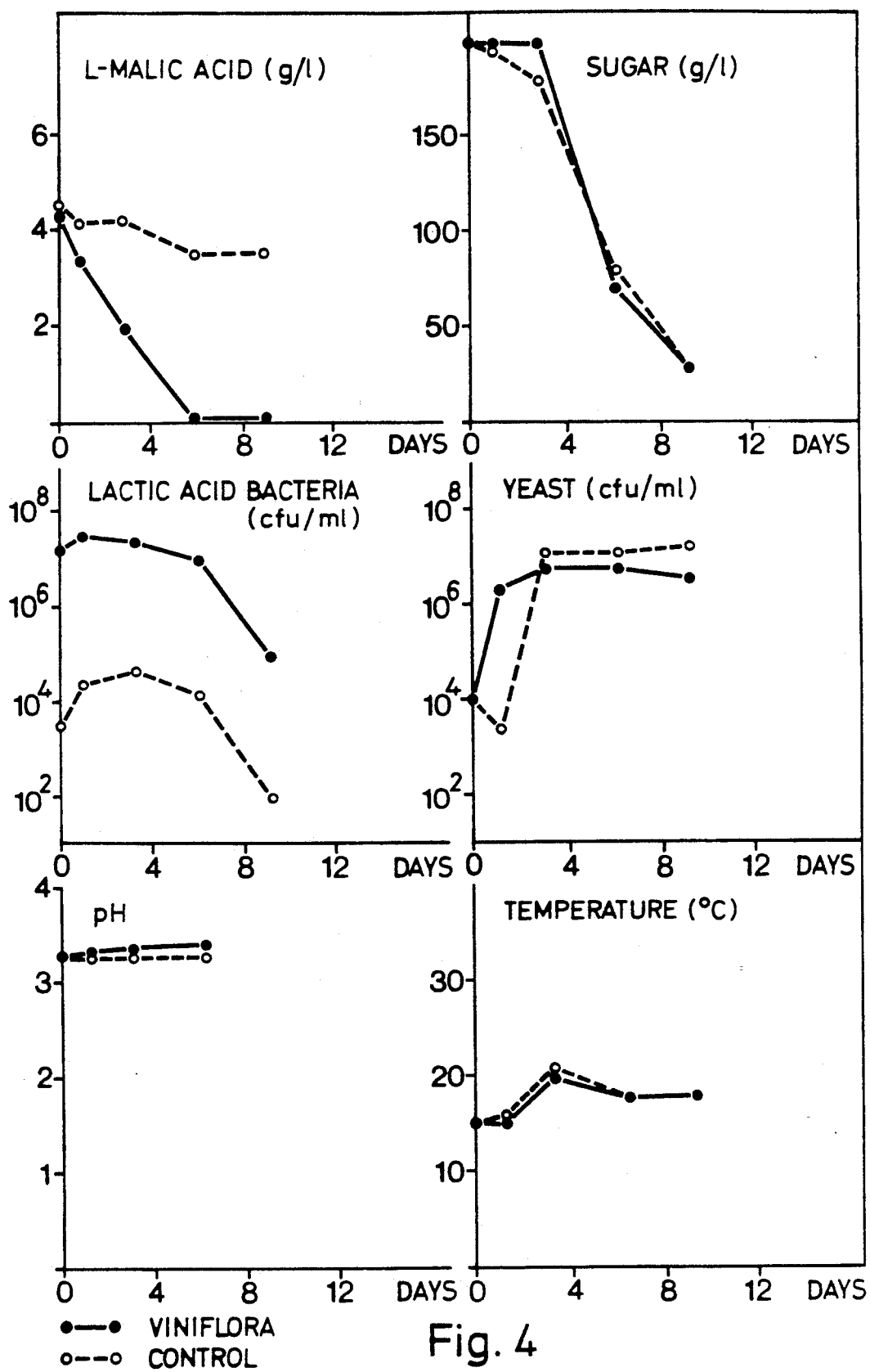
FIG. 4 shows the concentration of L-malic acid, pH and temperature and the evolution of lactic acid bacteria yeast and reducing sugars in white Chardonnay must inoculated with $4 \times 10^7$ CFU/ml of *L. plantarum*, DSM 4361, (—) compared to an inoculated control (—) inoculated with yeast only.

In the test, the concentration of L-malic acid was reduced to 0.08 g/ml (less than 2% of the initial level) in 6 days (FIG. 4) whereas malolactic fermentation failed to commence in the control during the 9 days' experimental period, although a slight degradation of L-malic acid due to yeast action was observed. In the test the malolactic fermentation elevated the pH to 3.4. The inoculated bacterial population increased to $5 \times 10^7$ CFU/ml during the first day, and the population stayed above $10^7$ CFU/ml for 6 days. From day 6 to 8, the bacteria were eliminated to $10^5$ CFU/ml or less than 0.3% of the inoculation level Neither yeast growth nor sugar fermentation rates were affected by the inoculated *L. plantarum* and no detectable acetic acid as measured by HPLC was produced.

I claim:

1. A method of inducing decarboxylation of malic acid in must or fruit juice, comprising the steps of:
   directly inoculating must or fruit juice with a culture of viable malolactic bacteria belonging to the genus Lactobacillus, the bacteria being homofermentative, selected for the inability to ferment sugar to lactic acid in the presence of malic acid, and selected for the ability to decarboxylate malic acid at a pH below about 3.2, and
   decarboxylating malic acid to form lactic acid without any significant consumption of sugar present in the must or fruit juice.

2. A method according to claim 1, wherein the malolactic bacteria are selected from the group consisting of *Lactobacillus plantarum, Lacrobacillus delbrockii, Lactobacillus buchneri, Lactobacillus hilgardii, Lactobacillus brevis, Lactobacillus casei, Lactobacillus acidophilus, Lactobacillus fermentum, Lactobacillus collinoides, Lactobacillus frucrivorans, Lactobacillus homohiochii, Lactobacillus sake, Lactobacillus yamanashiensis*, and mixtures thereof.

3. A method according to claim 1, wherein the must is converted into wine by alcoholic fermentation, the malolactic bacteria being added to the must before or at the commencement of or in the early stages of alcoholic fermentation.

4. A method according to claim 3, wherein the malolactic bacteria are selected for the inability to survive in fermented wine.

5. A method according to claim 4. wherein the malolactic bacterium is *Lactobacillus plantarum*, DSM 4361.

6. A method according to claim 1, wherein the culture is added in an amount of about $10^5$–$10^8$ colony-forming units/ml of must or fruit juice.

7. A method according to claim 1, wherein the culture is added in the form of a liquid, spray-dried, freeze-dried, droplet-frozen or deep-frozen composition comprising malolactic bacteria.

8. A method according to claim 7, wherein the spray-dried or freeze-dried composition is rehydrated before it is added to the must or fruit juice.

9. A method according to claim 1, wherein the must or fruit juice is produced from grapes, apples, cherries, blackcurrants, redcurrants, citrus or elderberries.

10. A method according to claim 3, wherein the must is converted into a red wine by alcoholic fermentation of a red wine must and the malolactic bacteria are added to the red wine must after crushing, after destemming or in the fermentor.

11. A method according to claim 3, wherein the malolactic bacteria are added to a 20–40% portion of a non-sulphited red wine must and left for about 15–30 hours before making up to volume with a sulphited red wine must.

12. A method according to claim 3, wherein the must is converted into a white or rose wine by alcoholic fermentation of a white or rosé wine must and the malolactic bacteria are added to the white or rosé wine must after the press, during the clarification process or in the fermentor.

13. A method according to claim 3, wherein the must is converted into a white or rose wine by alcoholic fermentation of a white or rosé wine must and the malolactic bacteria are added to the white or rosé wine must after the level of free $SO_2$ in the must has decreased to below about 10 ppm.

14. A method according to claim 3, wherein the malolactic bacteria are added before or simultaneously with the addition of yeast.

15. Wine in which at least about 40% of the malic acid, has been converted to lactic acid by the method of claim 1.

16. Wine as claimed in claim 15, wherein at least about 80% of the malic acid has been converted to lactic acid.

17. Wine as claimed in claim 15, wherein at least about 90% of the malic acid has been converted to lactic acid.

18. A method according to claim 1, wherein the malolactic bacteria are selected for the ability to ferment malic acid in must to lactic acid within 14 days.

19. A method according to claim 1, wherein the malolactic bacteria are selected for the ability to ferment malic acid in must to lactic acid within 7 days.

20. A method according to claim 1, wherein the malolactic bacteria are selected for the ability to ferment malic acid in must to lactic acid within 4 days.

* * * * *

UNITED STATES PATENT AND TRADEMARK OFFICE
CERTIFICATE OF CORRECTION

PATENT NO. : 5,077,060

DATED : July 5, 1991

INVENTOR(S) : Claus PRAHL

It is certified that error appears in the above-identified patent and that said Letters Patent is hereby corrected as shown below:

Title page, first column, [75]: "Gr sted" should read --Græsted--.

Front page, [56], line 15, "Microbio." should read --Microbiol.--;
    line 16, delete "L-";
    line 24, "C.R." should read --*C.R.*--;

Column two, line 55, after "wine" insert --.--.

Column three, lines 23-25, "*may advantageously be employed for inducing malolactic fermentation in liquids containing malic acid by direct inoculation*" should read --may advantageously be employed for inducing malolactic fermentation in liquids containing malic acid by direct inoculation--;
    line 30, "Lactobacillus" should read --*Lactobacillus*--.

UNITED STATES PATENT AND TRADEMARK OFFICE
CERTIFICATE OF CORRECTION

PATENT NO. : 5,077,060
DATED : July 5, 1991
INVENTOR(S) : Claus Prahl

It is certified that error appears in the above-indentified patent and that said Letters Patent is hereby corrected as shown below:

Column four, line 40: "*buckneri*" should read --*buchneri*--;
    line 41, "*Lacrobacillus*" should read --*Lactobacillus*--;
    line 52, "makes" should read --make--.

Column five, line 33, "ose weak" should read --ose, weak--.

Column six, line 50, insert after "apples" --,--.

Column seven, line 21, "(-)" should read --(...)--.
    line 27, "control (-)" should read --control (...)--;
    line 33, "(-)" should read --(...)--;
    line 38, "control(-)" should read --control (...)--.
    line 60, "in oculated" should read --inoculated--;
    line 61, "." should read -----.

Column 12, line 31, "*delbrockii*" should read --*delbrückii*--;
    line 35, "*frucrivorans*" should read --*fructivorans*--.

Column 13, line 4, "rose" should read --rosé--;
    line 11, "rose" should read --rosé--.

UNITED STATES PATENT AND TRADEMARK OFFICE
CERTIFICATE OF CORRECTION

PATENT NO. : 5,077,060
DATED : July 5, 1991
INVENTOR(S) : Claus Prahl

It is certified that error appears in the above-indentified patent and that said Letters Patent is hereby corrected as shown below:

Column 14, line 2, delete ",".

Signed and Sealed this

Nineteenth Day of October, 1993

Attest:

BRUCE LEHMAN

*Attesting Officer*          *Commissioner of Patents and Trademarks*